Patented Mar. 25, 1941

2,235,813

UNITED STATES PATENT OFFICE 2,235,813

β,β′ DIHYDROXYDIETHYL CYANAMIDE

Ingenuin Hechenbleikner, Greenwich, and Chris Best, Stamford, Conn., assignors to American Cyanamid Co., New York, N. Y., a corporation of Maine No Drawing. Application May 23, 1939, Serial No. 275,225

1 Claim. (Cl. 260—551)

This invention relates to a new disubstituted cyanamide compound of the formula—

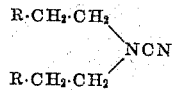

where R is hydroxy.

This compound may be generally prepared by the reaction between the corresponding secondary amine, cyanogen chloride and caustic soda. A preferred equation for this reaction is as follows:

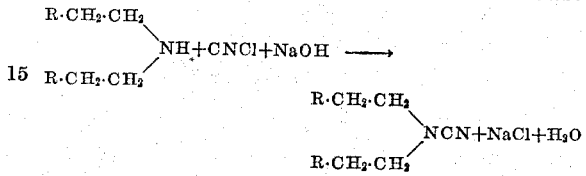

Example 212 grams of β,β′-dihydroxydiethyl amine are dissolved in one liter of water. After cooling the solution to about 5° C., 123 grams of cyanogen chloride are gradually added with stirring. When this addition is completed, the mixture is agitated with a solution of 80 grams of sodium hydroxide dissolved in 400 cc. of water and allowed to stand one hour. The aqueous solution is concentrated under vacuum to approximately 250 cc. The residue is diluted with alcohol and filtered to remove the salts. The filtrate, which is slightly alkaline, is neutralized with dilute hydrochloric acid. Benzene is added and the concentration continued. Further salt separates and is removed by filtration. The last traces of benzene and alcohol are driven out at 150° C./30 mm. The β,β′-dihydroxydiethyl cyanamide remains as a slightly yellow viscous liquid, which decomposes when an attempt is made to distill it at 250° C./1 mm.

This new compound is particularly useful as an intermediate and may be applied to the textile, insecticide and plasticizing arts.

While the invention has been described with reference to specific embodiments, it is to be understood that it is not to be limited thereto, but is to be construed broadly and restricted solely by the scope of the claim.

We claim:

As a new compound, β,β′-dihydroxydiethyl cyanamide.

INGENUIN HECHENBLEIKNER.
CHRIS BEST.